US010532799B2

(12) United States Patent
Cassanas et al.

(10) Patent No.: US 10,532,799 B2
(45) Date of Patent: Jan. 14, 2020

(54) DEVICE FOR TRANSPORTING AN INFLATABLE BOAT IN OPERATIONAL CONFIGURATION IN A SLING BENEATH A HELICOPTER, AND ASSEMBLY COMPRISING SAME

(71) Applicant: ZODIAC MILPRO INTERNATIONAL, Paris (FR)

(72) Inventors: Marc Cassanas, Paris (FR); Bruno Marion, Paris (FR); Yann Derlet, Paris (FR); Guillaume Lacoste, Paris (FR)

(73) Assignee: ZODIAC MILPRO INTERNATIONAL, Paris (FR)

( * ) Notice: Subject to any disclaimer, the term of this patent is extended or adjusted under 35 U.S.C. 154(b) by 0 days.

(21) Appl. No.: 16/095,833

(22) PCT Filed: Jul. 19, 2017

(86) PCT No.: PCT/FR2017/051968
§ 371 (c)(1),
(2) Date: Oct. 23, 2018

(87) PCT Pub. No.: WO2018/029406
PCT Pub. Date: Feb. 15, 2018

(65) Prior Publication Data
US 2019/0337602 A1 Nov. 7, 2019

(30) Foreign Application Priority Data
Aug. 11, 2016 (FR) ...................................... 16 57699

(51) Int. Cl.
B64D 1/22 (2006.01)
B63C 13/00 (2006.01)
(Continued)

(52) U.S. Cl.
CPC .............. B63C 13/00 (2013.01); B63B 7/082 (2013.01); B63B 7/085 (2013.01); B64D 1/22 (2013.01);
(Continued)

(58) Field of Classification Search
CPC .. B64D 17/24; B64D 1/00; B64D 1/22; B63B 7/085; B66C 1/20; B63C 3/10
See application file for complete search history.

(56) References Cited

U.S. PATENT DOCUMENTS 2,450,909 A * 10/1948 O'Neil .................... B63B 23/58
73/1.69
3,383,721 A * 5/1968 Adams, Jr. ................ B63C 9/22
114/365
(Continued)

FOREIGN PATENT DOCUMENTS

EP 2 218 671 A1 8/2010
GB 492 127 A 9/1938
GB 2 019 808 A 11/1979

OTHER PUBLICATIONS

International Search Report, dated Oct. 6, 2017, from corresponding PCT application No. PCT/FR2017/051968.

Primary Examiner — Andrew Polay
(74) Attorney, Agent, or Firm — Young & Thompson

(57) ABSTRACT

The device includes a sling with four flexible support strands, including a pair of rear strands, each of which is attached by a bottom end to one of two lifting points provided in the lateral end portions of the transom stern, and a top end of which is linked to at least one attachment member, for engaging with a hook suspended beneath a helicopter, and two strands, each forming a loop capable of passing around the outer lower contours of the two lateral floats and beneath the keel of the boat, and of which each of the two ends is attached to the attachment member, one of (Continued)

Figure 1:
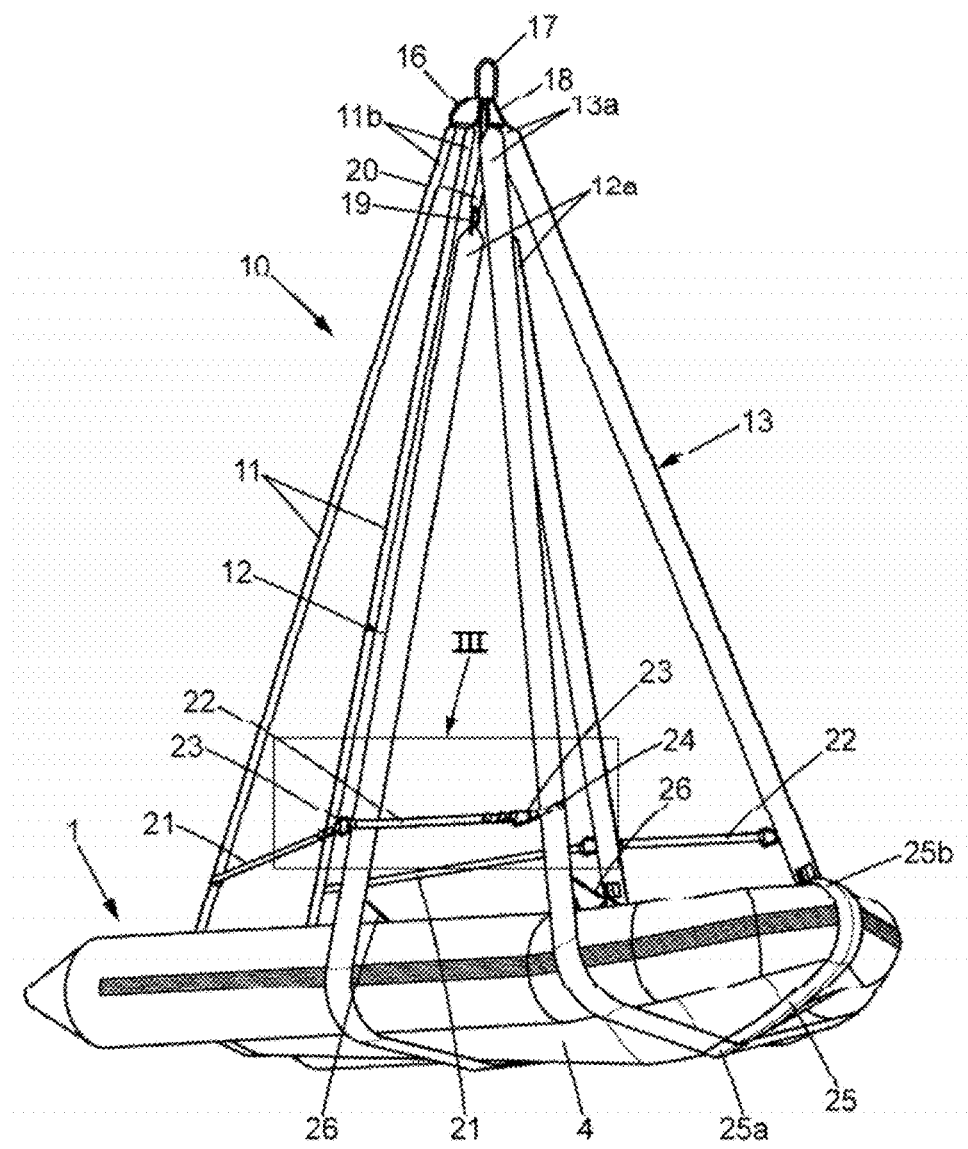

the two looped strands, referred to as the "middle" strand, surrounding the boat at the central portion of the latter, and the other looped strand, referred to as the "front" strand, surrounding the boat at the bow of the boat.

20 Claims, 2 Drawing Sheets

(51) Int. Cl.
*B64D 9/00* (2006.01)
*B63B 7/08* (2006.01)
*B64C 27/04* (2006.01)
*B63C 3/10* (2006.01)

(52) U.S. Cl.
CPC ............... *B64D 9/00* (2013.01); *B63C 3/10* (2013.01); *B64C 27/04* (2013.01)

(56) References Cited

U.S. PATENT DOCUMENTS

| | | | |
|---|---|---|---|
| 4,159,840 A * | 7/1979 | Fengels | B66C 1/18 294/77 |
| 5,320,394 A * | 6/1994 | Urbank | B63B 23/60 114/44 |
| 5,492,383 A | 2/1996 | Kentner, Sr. | |
| 5,735,561 A * | 4/1998 | Parkins | B63C 3/06 114/44 |
| 5,791,281 A | 8/1998 | Davidson | |

\* cited by examiner

DEVICE FOR TRANSPORTING AN INFLATABLE BOAT IN OPERATIONAL CONFIGURATION IN A SLING BENEATH A HELICOPTER, AND ASSEMBLY COMPRISING SAME

The present invention relates to a device for transporting an inflatable boat in operational configuration in a sling beneath a helicopter, the inflatable boat being of the general known type comprising two lateral floats, each comprising at least one inflatable tube, and which are separated from one another at the rear portion of the lateral floats, at the stern of the boat, by a rigid transom able to support at least one motor for propulsion, the two floats converging towards one another at the front, towards the longitudinal central axis of the boat, at the bow of the boat, which also comprises a keel connecting the lower portions of the two lateral floats and a bottom extending between the two lateral floats.

"Operational configuration" is understood to mean that the inflatable boat is inflated and fully equipped for use in a marine environment, namely its release and/or retrieval at sea, with a particular interest in retrieval at sea, at least one motor for propulsion preferably being ready for use on the transom, or at least stored in the boat, at least one fuel tank being onboard on the bottom of the boat if the motor is an internal combustion engine or electric batteries being onboard if the motor is electric, various equipment such as paddles, waterproof bags with boating supplies, compressed air cylinders, and a set of accessories for keel management, if the keel is at least partially inflatable, also being carried onboard with the passenger equipment, while the passengers and a crew of at least one person will be transported in the helicopter and will board the boat after it is launched, and will be hoisted from the boat into the helicopter before the boat is lifted from the water by the helicopter, to enable fast response, for example in a rescue or recovery operation. For example, for a boat having an empty weight of 160 kg, the maximum weight of the boat in operational configuration can reach 680 kg.

In order to carry out fast response interventions of the type mentioned above, the device for transporting an inflatable/foldable boat beneath a helicopter according to the invention must allow both deployment at sea, or possibly on land, which assumes an approach which transports the boat in a sling beneath a helicopter then deposits it on water or on land and then releases it from its connection to the helicopter, but also recovery at sea, which assumes the capability of placing the sling system back in position while the boat is on the water, and reestablishing the connection of the boat floating on the water and a helicopter, and then lifting the boat by helicopter and quickly carrying it away.

To allow this type of intervention, a cumbersome and expensive system has already been proposed, consisting essentially of a rigid metal platform suspended beneath a helicopter, onto which the boat is rolled with an automatic inflation system. The assembly of boat and platform is placed on the water, such that the boat can be released from the platform which is then lifted and carried away by the helicopter. Another known system comprises a harness, which is very specific to the type of helicopter and where the boat is inflated and pinned under the helicopter. However, operational recovery is not considered with these known systems involving a platform or harness.

In addition to being bulky and expensive, such systems are incompatible with all the complete missions that may be required of an inflatable boat, its crew, and its passengers, as indicated above.

The aim of the invention is to provide a device which allows transport and launch, as well as recovery on the water, of an inflatable boat in operational configuration in a sling beneath a helicopter, and which overcomes the aforementioned disadvantages of systems of the prior art while being more compatible with any type of helicopter.

In order to overcome the disadvantages presented by known devices for transporting an inflatable boat in operational configuration beneath a helicopter, the invention proposes a transport device comprising a sling with four flexible support lines including one pair of lines each of which can be attached by a so-called "lower" end to a respective one of two lifting points, and a so-called "upper" end of each of said lines can be connected to at least one attachment member suitable for engaging with a hook suspended beneath a helicopter, and two flexible support lines, each forming a loop to pass around the external and lower lateral contours and under the keel of the boat, and of which each of the two ends is attached to said at least one attachment member, one of the two looped lines referred to as the "front" line being able to surround the boat at the bow of the boat, characterized in that the other looped line referred to as the "middle" line is able to surround the boat at the central portion of the boat, and in that said lines able to be connected to the two lifting points are rear lines each able to be attached to a lifting point arranged in one of the respective two lateral end portions of the transom, the device further comprising a forward lower line which connects the loop of the front line to the front of the boat and is able to prevent said front line from moving closer towards said middle line, said forward lower line being a flat nose strap, of which a so-called "front" end can be detachably fixed to an attachment point on the nose of the boat, and of which the other so-called "back" end is integral with the middle of the front line and is positioned substantially at the keel point in the usage position of the device.

This transport device has the advantage that its essential components are flexible and can be folded and rolled up in a bag, and that the entire device is therefore compact and can be kept in the boat during the mission, and thus can easily be reattached for the helicopter lifting and evacuation phase.

Another advantage that stems from the flexible nature of the basic components of this device is that the device can adapt perfectly to the shape and design of an inflatable and/or foldable boat, using existing lifting points at the transom and ensuring excellent distribution of forces on the inflated part of the boat. The four-line sling of the invention makes it possible to adjust the positions of the lines to the size of the boat, and preferably also to maintain them in position by means which restrict the amount of space between the lines of the sling. In addition, such a four-line sling device can be sized and produced in accordance with existing civil and military standards for this type of equipment.

Advantageously, for this purpose, the transport device according to the invention also has at least one of the following characteristics:

- the "middle" and "front" lines are each a wide strap, which distributes the lifting forces on the boat in a manner which limits the exerted pressures sufficiently to avoid bending and damaging the inflated tubes in particular;
- the "middle" line is advantageously of adjustable length while the front line and the two rear lines are of fixed length, these fixed lengths being chosen to give a slight positive trim to the boat, meaning that the boat is slightly arched;

the device further comprises flexible anti-separation connections between the front, middle, and rear support lines, on each side of the boat, and preferably the flexible anti-separation connections comprise, on each side of the boat, a rear connection connecting the rear line of the side concerned to the middle line, and a front connection connecting the middle line to the front line; and preferably the adjustable lengths of these flexible anti-separation connections are adjusted after the spacings between the lines have been defined, for each boat, so that the weights supported by each line are equivalent;

the attachment member is a rigid upper ring, for example of metal, adapted for attachment to the hook of a cargo winch system of a helicopter;

the device also comprises at least one detachable positioning connection, comprising a hook or carabiner and a bungee cord, of which one end is integral with a portion of the front or middle line in proximity to and above a lateral float of the boat, in the usage position, such that the positioning connection is able to detachably connect said front or middle line to a retaining ring on said float of the boat; and the device further comprises at least two detachable positioning connections, each able to connect the middle or front line, with which it is integral at one end, to one of two respective retaining rings on a lateral float of the boat, of which one is towards the front and the other towards the rear of the boat relative to said middle or front line, each of the two positioning connections comprising a hook or carabiner and a bungee cord.

Thus, the front and middle lines can each be held in, and possibly returned to, their most appropriate position for the dimensions of the boat, and such detachable positioning connections ensure proper positioning of these front and middle lines.

The invention also relates to an assembly comprising an inflatable boat of the type defined above, and a device for transporting said inflatable boat in operational condition in a sling beneath a helicopter, the sling transport device being as defined above.

Figure 2:
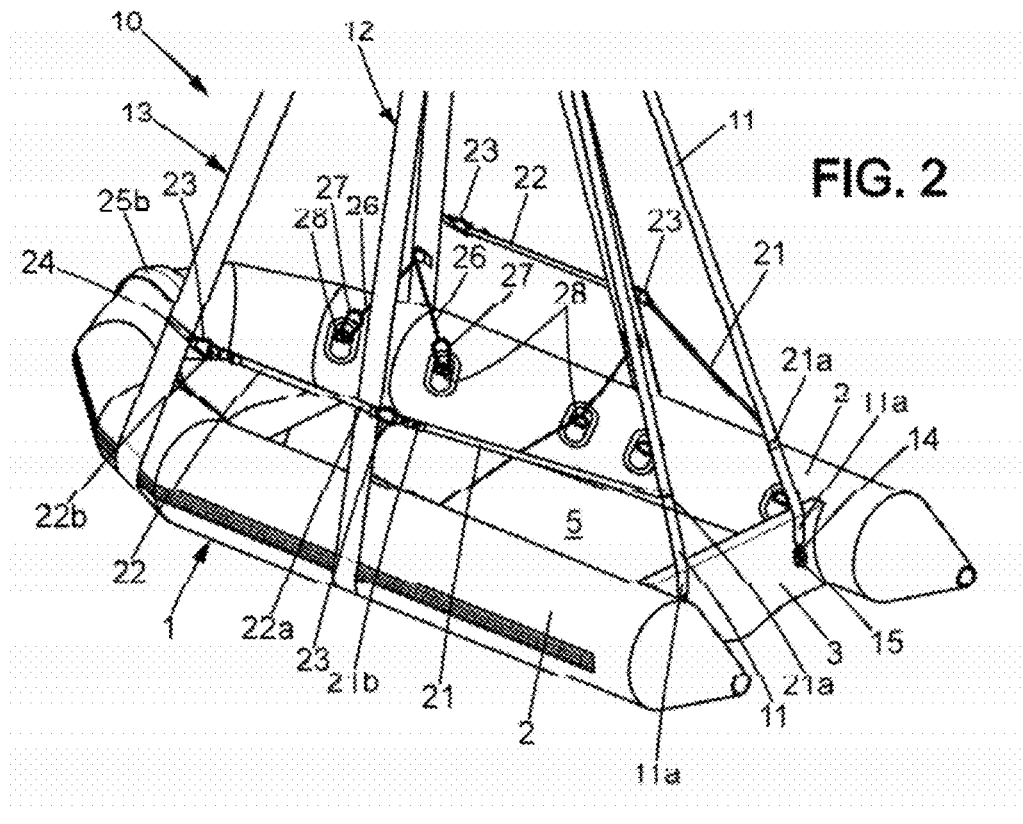
Figure 3:
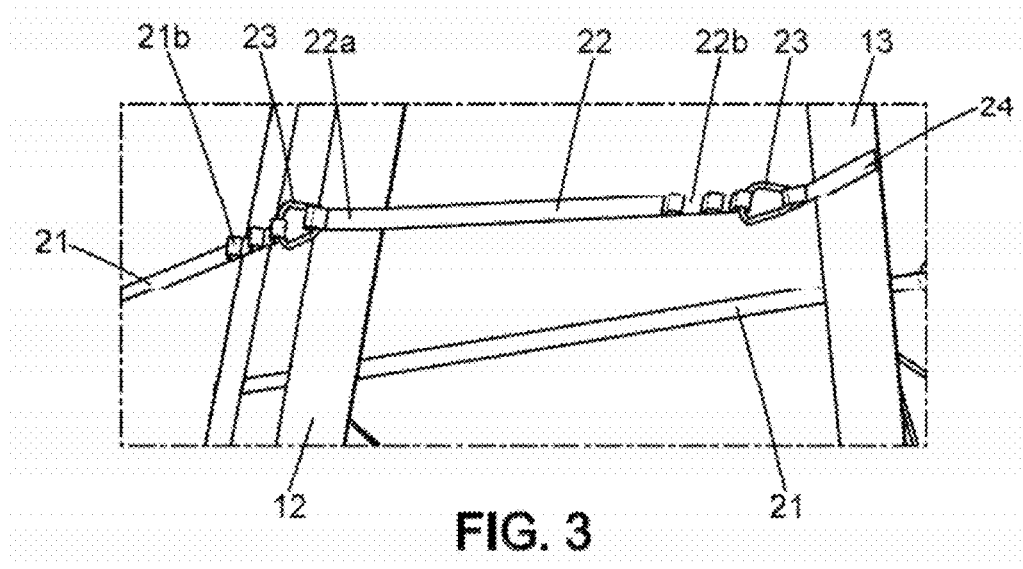

Other features and advantages of the invention will be apparent from the non-limiting description given below of an exemplary embodiment, described with reference to the accompanying drawings in which:

FIG. 1 is a schematic perspective view of the front and side of an inflated inflatable boat that is equipped with a transport device according to the invention, shown in the position of transport beneath a helicopter, suspended from a hook (not shown) of a cargo winch system (also not shown) of a helicopter, FIG. 2 is also a perspective view, but from the rear, side, and above, of the boat shown suspended in FIG. 1, and FIG. 3 is an enlarged view of some details of FIG. 1.

The inflatable boat 1, shown inflated in FIGS. 1 and 2, is of a well-known conventional structure, and comprises two lateral floats 2 including an inflatable tube of generally cylindrical shape, a rigid transom 3 at the stern of the boat, intended to support at least one motor for propulsion and secured transversely to the lateral floats 2, between the floats and to the rear portions of these floats 2, the front portions of the floats 2 drawing closer to one another towards the longitudinal central axis of the boat and joining at the front of the boat to form its bow, a keel 4 connecting the lower portions of the two lateral floats 2 to each other, and a bottom 5 extending between the two floats 2.

In FIGS. 1 and 2, the inflatable boat 1 is not shown in an operational configuration, in order to better represent the relative positions of the constituent parts of the boat 1 and the components of the transport device according to the invention, which essentially comprises a sling 10 with four flexible support lines, including a so-called "rear" pair of lines 11, a so-called "middle" line 2, and a so-called "front" line 13.

The two rear lines 11 are identical to each other in dimensions and structure, and each of them is equipped, at a so-called "lower" end 11a, with a shackle 14 for attachment to one of two respective attachment and lifting points each formed on one of the two side portions of the transom 3, and implemented as a chainplate 15 protruding from the rear face of the transom 3 (see FIG. 2). Each rear line 11 is also hooked by its other end, referred to as the "upper" end 11b, to a flexible ring 16 of fabric, itself attached to a main ring 17 that is rigid and oval, for example of stainless steel, compatible with the hooks that equip helicopter cargo winch systems for sling transport by helicopter.

Each of the middle 12 and front 13 lines forms a loop between two so-called "upper" ends, respectively 12a and 13a, each of which is indirectly attached to the so-called "upper" main attachment member composed of the ring 17, by means of another flexible fabric ring 18, for the upper ends 13a of the front line 13, and by means of a carabiner 19 and a short connecting line 20 for each of the two upper ends 12a of the middle line 12 (see FIG. 1).

The two looped middle 12 and front 13 lines can thus extend around the external and lower contours of the two floats 2 and under the keel 4 of the boat 1, to support the front and central portions of the boat, its lower portion being supported by the two rear lines 11, the entire load being borne by the upper main ring 17, intended to engage with a hook under a helicopter, enabling transport of the boat 1 in operational configuration in a sling beneath a helicopter, its release into the sea as well as its lifting from the sea and its transport suspended in the sling 10 as shown in FIGS. 1 and 2. Thus, the front line 13 surrounds the boat 1 at the bow of the boat, and the middle line 12 surrounds the boat 1 at the central portion of the boat.

Although the two rear lines 11 may each be implemented as a strap of small or medium width, for example 50 to 70 mm wide, the looped middle 12 and front 13 lines are formed by wide straps, of a width greater than 100 mm, for example 150 mm, so that the contact pressure against the boat 1 is not damaging while safely supporting the load of the boat 1 in its operational configuration, as indicated above.

The length of each rear line 11 is fixed and is much less than the fixed length of the looped front line 13, which in turn is close to the length of the looped middle line 12, which is preferably adjustable. For example, for a boat 4.70 m or 5.30 m long, each of the two rear lines 11 can have a length of 467 cm, the front line 13 can be 1180 cm, and the middle line 1173 cm in length and adjustable by ±150 cm.

The spacing between the front 13 and middle 12 lines and between the middle line 12 and the rear lines 11 is defined for each boat, so that the weights supported by each line are equivalent. To maintain the appropriate spacing, flexible anti-separation connections are installed between the front 13, middle 12, and rear 11 support lines, on each side of the boat 1.

As shown in FIGS. 1 and 2, and in detail in FIG. 3, on each side of the boat 1 the flexible anti-separation connections comprise a rear connection 21, its back end 21a being integral to the rear line 11 on the corresponding side, and its front end 21*b*, where this rear connection 21 is adjustable in length, being connected by a carabiner 23 to the back end portion 22*a*, which is integral to the middle line 12 of the corresponding side, of the front anti-separation connection 22 which is, at its front end portion 22*b* by which it is adjustable in length, itself connected to a detachable other carabiner 23 retained on a fabric tongue 24 integral to the flat strap of the front line 13.

In addition, to prevent the front line 13 from moving closer to the middle line 12, a forward lower line 25, also in the form of a flat and wide strap, connects the front line 13, at the middle of the loop formed by the latter, to the front of the boat 1. More specifically, this forward lower line 25 extends, in the usage position of the device, over the front portion of the point of the keel 4, and an end referred to as the "back" end 25*a* of this forward lower line 25 is integral to the middle of the strap of the front line 13, and the other, upper front end 25*b* of the forward lower line 25 is detachably fixed by a carabiner to a ring attached to the nose of the boat 1, this detachable carabiner and the ring not being visible in the accompanying figures.

To ensure that the middle 12 and front 13 lines are maintained in the most appropriate positions relative to the central portion and to the front of the boat 1 respectively, detachable positioning connections 26 are further provided on these lines 12 and 13, schematically shown in FIGS. 1 and 2, each comprising a hook or carabiner 27 and a bungee cord, of which the end on the side opposite the hook or carabiner is integral with the middle line 12 or the front line 13, in an area of this line which is located a short distance above and externally to the lateral float 2 of the corresponding side, when the sling is in the usage position, so that the hook or carabiner 27 of the positioning connection 26 can hook onto a ring 28, integral with the inflatable tube of the corresponding lateral float 2, on its upper inner portion. Preferably, two positioning connections 26 can be substantially integral to the same portion of a line 12 or 13 and one of them hooks to a forward ring 28 and the other to a rearward ring 28 on the boat 1, relative to the appropriate position of the front line 13 or middle line 12 with respect to the boat 1.

The lifting points of the boat 1 formed by the two chainplates 15 of the transom 3 as well as the strap portions of the front 13 and middle 12 lines which pass under the keel 4 and the floats 2 are thus judiciously distributed, ensuring proper transport of the boat 1 in its operational configuration.

The invention claimed is:

1. Device for transporting an inflatable boat (1) in operational configuration in a sling beneath a helicopter, the inflatable boat (1) being of the general known type comprising two lateral floats (2), each comprising at least one inflatable tube, and which are separated from one another at the rear portion of the lateral floats (2), at the stern of the boat, by a rigid transom (3) able to support at least one motor for propulsion, the two floats (2) converging towards one another at the front, towards the longitudinal central axis of the boat, at the bow of the boat, which also comprises a keel (4) connecting the lower portions of the two lateral floats (2) and a bottom (5) extending between the two lateral floats (2), the transport device comprising a sling (10) with four flexible support lines including a pair of lines (11) each of which can be attached by a so-called "lower" end (11*a*) to a respective one of two lifting points (15) and a so-called "upper" end (11*b*) of each of said lines (11) is connected to at least one attachment member (17), suitable for engaging with a hook suspended beneath a helicopter, and two flexible support lines (12, 13) each forming a loop to pass around the external and lower lateral contours and under the keel (4) of the boat (1), and of which each of the two ends (12*a*, 13*a*) is attached to said at least one attachment member (17), one (13) of the two looped lines, referred to as the "front" line, being able to surround the boat (1) at the bow of the boat, wherein the other looped line, referred to as the "middle" line (12), is able to surround the boat (1) at the central portion of the boat, and wherein said lines (11) able to be connected to the two lifting points (15) are rear lines (11) each able to be attached to a lifting point arranged in one of the respective two lateral end portions of the transom (3), the device further comprising a forward lower line (25) which connects the loop of the front line to the front of the boat and is able to prevent said front line (13) from moving closer towards the middle line (12), said forward lower line (25) being a flat nose strap, of which a so-called "front" end (25*b*) can be detachably fixed to an attachment point on the nose of the boat (1), and of which the other so-called "back" end (25*a*) is integral with the middle of the front line (13) and is positioned substantially at the point of the keel (4) in the usage position of the device.

2. Transport device according to claim 1, wherein the "middle" (12) and "front" (13) lines are each a wide strap.

3. Transport device according to claim 1, wherein said "middle" line (12) is of adjustable length, while the front line (13) and the two rear lines (11) are of fixed length.

4. Transport device according to claim 1, further comprising flexible anti-separation connections (21, 22) between the front (13), middle (12), and rear (11) support lines, on each side of the boat (1).

5. Transport device according to claim 4, wherein, on each side of the boat (1), the flexible anti-separation connections comprise a rear connection (21) connecting the rear line (11) of the side concerned to the middle line (12), and a front connection (22) connecting the middle line (12) to the front line (13).

6. Transport device according to claim 1, wherein said attachment member is a rigid upper ring (17), for example of metal, adapted for attachment to the hook of a cargo winch system of a helicopter.

7. Transport device according to claim 1, further comprising at least one detachable positioning connection (26), comprising a hook or carabiner (27) and a bungee cord, of which one end is integral with a portion of the front (13) or middle (12) line in proximity to and above a lateral float (2) of the boat (1), in the usage position, such that the positioning connection (26) is able to detachably connect said front (13) or middle (12) line to a retaining ring (28) on said float (2) of the boat (1).

8. Transport device according to claim 1, further comprising at least two detachable positioning connections (26), each able to connect the middle (12) or front (13) line, with which it is integral at one end, to one of two respective retaining rings (28) on a lateral float (2) of the boat (1), of which one is towards the front and the other towards the rear of the boat (1) relative to said middle (12) or front (13) line, each of the two positioning connections (26) comprising a hook or carabiner (27) and a bungee cord.

9. An assembly comprising an inflatable boat (1) of the type comprising two lateral floats (2), each comprising at least one inflatable tube, and which are separated from one another at the rear portion of the lateral floats (2), at the stern of the boat, by a rigid transom (3) able to support at least one motor for propulsion, the two floats (2) converging towards one another at the front, towards the longitudinal central axis of the boat, at the bow of the boat, which also comprises a keel (4) connecting the lower portions of the two lateral floats (2) and a bottom (5) extending between the two lateral floats (2), and a device for transporting said inflatable boat (1) in operational configuration in a sling beneath a helicopter, wherein said sling transport device is according to claim 1.

10. Transport device according to claim 2, wherein said "middle" line (12) is of adjustable length, while the front line (13) and the two rear lines (11) are of fixed length.

11. Transport device according to claim 2, further comprising flexible anti-separation connections (21, 22) between the front (13), middle (12), and rear (11) support lines, on each side of the boat (1).

12. Transport device according to claim 3, further comprising flexible anti-separation connections (21, 22) between the front (13), middle (12), and rear (11) support lines, on each side of the boat (1).

13. Transport device according to claim 2, wherein said attachment member is a rigid upper ring (17), for example of metal, adapted for attachment to the hook of a cargo winch system of a helicopter.

14. Transport device according to claim 3, wherein said attachment member is a rigid upper ring (17), for example of metal, adapted for attachment to the hook of a cargo winch system of a helicopter.

15. Transport device according to claim 4, wherein said attachment member is a rigid upper ring (17), for example of metal, adapted for attachment to the hook of a cargo winch system of a helicopter.

16. Transport device according to claim 5, wherein said attachment member is a rigid upper ring (17), for example of metal, adapted for attachment to the hook of a cargo winch system of a helicopter.

17. Transport device according to claim 2, further comprising at least one detachable positioning connection (26), comprising a hook or carabiner (27) and a bungee cord, of which one end is integral with a portion of the front (13) or middle (12) line in proximity to and above a lateral float (2) of the boat (1), in the usage position, such that the positioning connection (26) is able to detachably connect said front (13) or middle (12) line to a retaining ring (28) on said float (2) of the boat (1).

18. Transport device according to claim 3, further comprising at least one detachable positioning connection (26), comprising a hook or carabiner (27) and a bungee cord, of which one end is integral with a portion of the front (13) or middle (12) line in proximity to and above a lateral float (2) of the boat (1), in the usage position, such that the positioning connection (26) is able to detachably connect said front (13) or middle (12) line to a retaining ring (28) on said float (2) of the boat (1).

19. Transport device according to claim 4, further comprising at least one detachable positioning connection (26), comprising a hook or carabiner (27) and a bungee cord, of which one end is integral with a portion of the front (13) or middle (12) line in proximity to and above a lateral float (2) of the boat (1), in the usage position, such that the positioning connection (26) is able to detachably connect said front (13) or middle (12) line to a retaining ring (28) on said float (2) of the boat (1).

20. Transport device according to claim 5, further comprising at least one detachable positioning connection (26), comprising a hook or carabiner (27) and a bungee cord, of which one end is integral with a portion of the front (13) or middle (12) line in proximity to and above a lateral float (2) of the boat (1), in the usage position, such that the positioning connection (26) is able to detachably connect said front (13) or middle (12) line to a retaining ring (28) on said float (2) of the boat (1).

* * * * *